United States Patent
Thorsheim

[11] Patent Number: 5,860,430
[45] Date of Patent: Jan. 19, 1999

[54] COMBINATION COMB AND ICE SCRAPER

[76] Inventor: Kevin L. Thorsheim, 19962 368th St., Forest City, Iowa 50436

[21] Appl. No.: 941,899

[22] Filed: Sep. 30, 1997

[51] Int. Cl.[6] .................................................. A45D 24/10
[52] U.S. Cl. ..................... 132/148; 15/105; 15/236.02; 15/236.05; 15/236.08
[58] Field of Search .................. 132/148, 120, 132/149; D28/25, 28, 31; 15/105, 142, 236.01, 236.02, 236.05, 236.06, 236.08

[56] References Cited

U.S. PATENT DOCUMENTS

| | | | |
|---|---|---|---|
| D. 170,460 | 9/1953 | Hauser | D32/49 |
| D. 174,801 | 5/1955 | Davidson | D28/25 |
| D. 221,244 | 7/1971 | Lawrence | D32/46 |
| D. 251,073 | 2/1979 | Whiteman . | |
| D. 253,970 | 1/1980 | Whiteman | D28/25 |
| D. 253,971 | 1/1980 | Whiteman . | |
| 2,245,469 | 6/1941 | Ecklund et al. | 132/148 |
| 2,544,310 | 3/1951 | Gerhan | 15/236.08 |
| 2,856,621 | 10/1958 | Racicot | 15/236.02 |
| 3,563,254 | 2/1971 | Dapolito . | |
| 3,570,121 | 3/1971 | Graceffo . | |
| 3,763,515 | 10/1973 | Voss | 15/236.08 |
| 4,363,155 | 12/1982 | Regina | 15/236.02 |
| 4,747,175 | 5/1988 | Durgin | 15/236.02 |
| 5,099,540 | 3/1992 | Paschetto | 15/236.02 |
| 5,272,782 | 12/1993 | Hutt . | |

*Primary Examiner*—Todd E. Manahan
*Assistant Examiner*—Eduardo C. Robert
*Attorney, Agent, or Firm*—Richard L. Miller, P.E.

[57] ABSTRACT

A combination comb and ice scraper that is adaptable to comb hair of a user and to be utilized by the user to scrape ice off a windshield. The combination includes a comb and an ice scraper. The comb combs the hair of the user. And, the ice scraper is associated with the comb and scrapes the ice off the windshield.

1 Claim, 2 Drawing Sheets

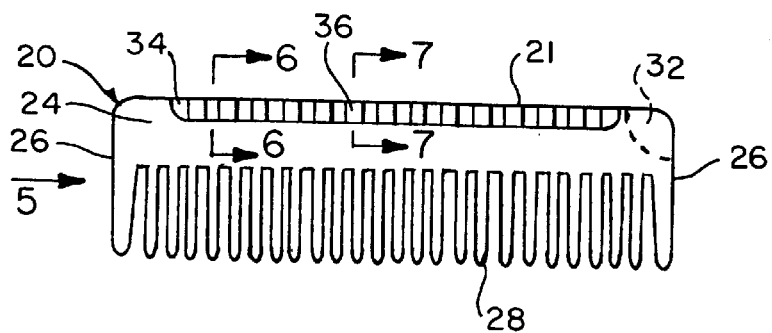
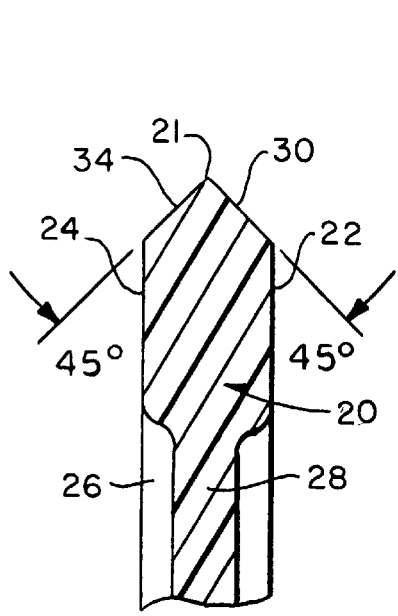
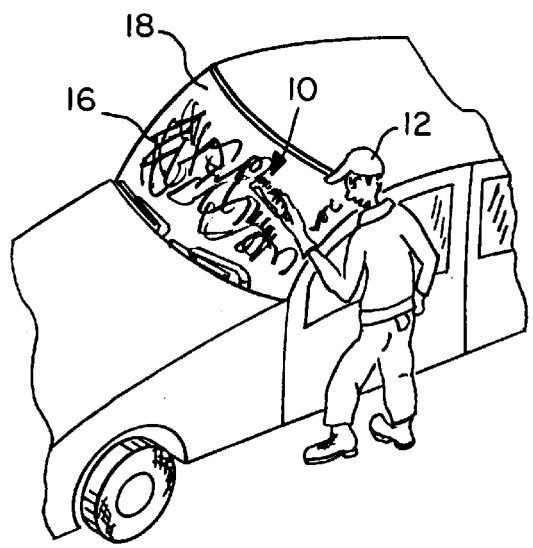

COMBINATION COMB AND ICE SCRAPER

BACKGROUND OF THE INVENTION

1. Field of the Invention

The present invention relates to a comb. More particularly, the present invention relates to a combination comb and ice scraper.

2. Description of the Prior Art

Numerous innovations for combination combs have been provided in the prior art that will be described. Even though these innovations may be suitable for the specific individual purposes to which they address, however, they differ from the present invention.

FOR EXAMPLE, U.S. Pat. No. Des. 251,073 to Whiteman teaches the ornamental design for a combined comb and nail file.

ANOTHER EXAMPLE, U.S. Pat. No. Des. 253,971 to Whiteman teaches the ornamental design for a comb having a cavity for holding a nail file or the like.

STILL ANOTHER EXAMPLE, U.S. Pat. No. 3,563,254 to Dapolito teaches a comb for the hair having a self-contained nail filing and brushing attachment which is easily withdrawn and separated from the comb during use and which is housed substantially entirely within the comb during periods of nonuse without interfering with the normal usage of the comb.

YET ANOTHER EXAMPLE, U.S. Pat. No. 3,570,121 to Graceffo teaches a comb having a toothed head with front and back sides secured together. A razor blade secured to a carrier in a recess between the sides is slidable from a spring-biased extended position with its edge crossing the tooth intervals to a position withdrawn from the teeth. Each tooth has one side curved to deflect combed hair in one direction longitudinally of the comb and the carrier is guided in the recess to slide the blade in the other direction when moved by hair pressure from extended to withdrawn position.

FINALLY, STILL YET ANOTHER EXAMPLE, U.S. Pat. No. 5,272,782 to Hutt teaches a tool that includes an integral body having a flat scraper part, a collar part, and a comb part. The tool body is made from a resilient, yet substantially rigid material. The scraper part is to be used as a trowel by a painter. The collar part is used in axially engaging a cylindrical paint roller soaked with paint, to frictionally remove paint from the paint roller as the collar part is displaced from one end to the opposite end of that paint roller. The comb part is used to clean the bristles of a paint brush, by transversely engaging same and lengthwisely sliding or "combing" the bristles to remove paint after the paint job is completed.

It is apparent that numerous innovations for combination combs have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a combination comb and ice scraper that avoids the disadvantages of the prior art.

ANOTHER OBJECT of the present invention is to provide a combination comb and ice scraper that is simple and inexpensive to manufacture.

STILL ANOTHER OBJECT of the present invention is to provide a combination comb and ice scraper that is simple to use.

BRIEFLY STATED, YET ANOTHER OBJECT of the present invention is to provide a combination comb and ice scraper that is adaptable to comb hair of a user and to be utilized by the user to scrape ice off a windshield. The combination includes a comb and an ice scraper. The comb combs the hair of the user. And, the ice scraper is associated with the comb and scrapes the ice off the windshield.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures on the drawing are briefly described as follows:

FIG. 2 is a diagrammatic perspective view of the present invention being utilized as an ice scraper;

FIG. 4 is an enlarged diagrammatic side elevational view of the other side of the present invention;

FIG. 8 is an enlarged cross section view, with parts broken away, taken on line 8—8 in FIG. 3.

Figure 1:
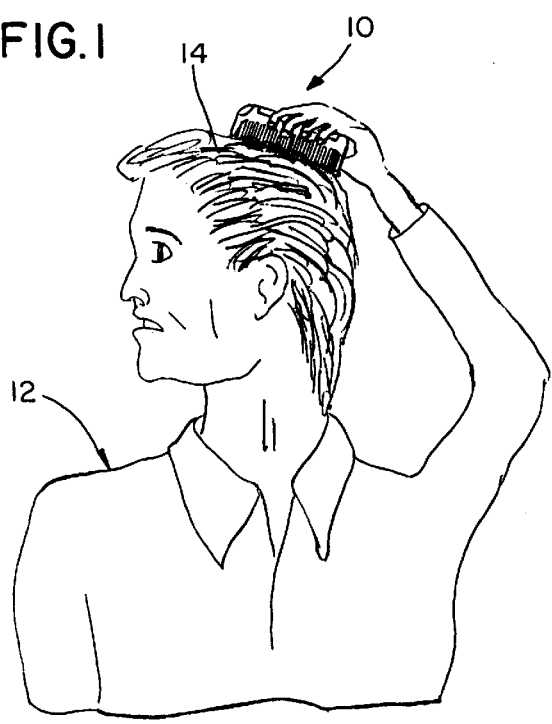
FIG. 1 is a diagrammatic perspective view of the present invention being utilized as a comb.
Figure 5:
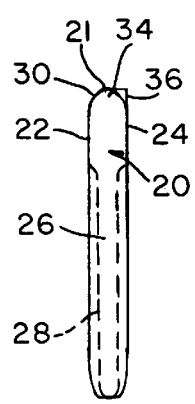
FIG. 5 is an enlarged diagrammatic end elevational view taken generally in the direction of arrow 5 in FIGS. 3 and 4.
Figure 7:
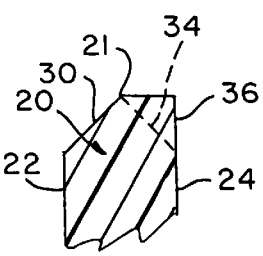
FIG. 7 is an enlarged cross sectional view, with parts broken away, taken along line 7—7 in FIG. 4.
Figure 6:
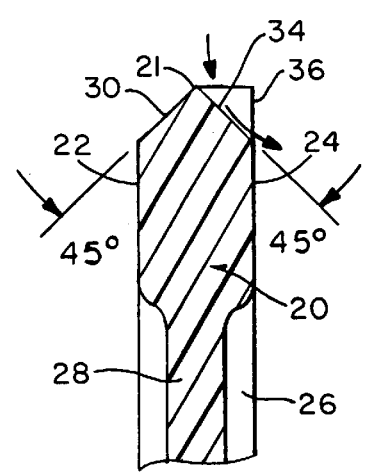
FIG. 6 is an enlarged cross sectional view, with parts broken away, taken along line 6—6 in FIG. 4.
Figure 3:
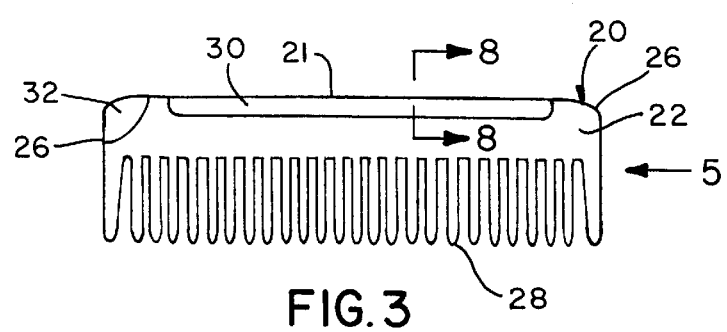
FIG. 3 is an enlarged diagrammatic side elevational view of one side of the present invention.

LIST OF REFERENCE NUMERALS UTILIZED IN THE DRAWING 10 combination comb and ice scraper of the present invention
12 user
14 hair of user 12
16 ice on windshield 18
18 windshield
20 spine
21 apex of spine 20
22 first side of spine 20
24 second side of spine 20
26 pair of ends of spine 20
28 plurality of teeth
30 first surface on first side 22 of spine 20
32 second surface on first side 22 of spine 20
34 third surface on second side 24 of spine 20
36 plurality of teeth on third surface 34 on second side 24 of spine 20

DETAILED DESCRIPTION OF THE PREFERRED EMBODIMENT

Referring now to the figures in which like numerals indicate like parts, and particularly to FIGS. 1 and 2, the combination comb and ice scraper of the present invention is shown generally at 10 being utilized by a user 12 to comb hair 14 of the user 12, and being utilized by the user 12 to scrape ice 16 off a windshield 18, respectively.

The configuration of the combination comb and ice scraper 10 can best be seen in FIGS. 3–8, and as such will be discussed with reference thereto.

The combination comb and ice scraper 10 has a spine 20 that is longitudinally-disposed and has an apex 21, a first side 22, a second side 24 that opposes the first side 22 of the spine 20, and a pair of ends 26.

The combination comb and ice scraper 10 further has a plurality of teeth 28 that extend downwardly from the spine 20 along its entire length and in combination with the spine 20 function as a comb.

The first side 22 of the spine 20 has disposed therealong a first surface 30 that is slender, elongated, and originates from above the plurality of teeth 28 and bevels 45 degrees upwardly therefrom into the apex 21 of the spine, and extends continuously therealong from short of one end 26 of the pair of ends 26 of the spine 20 to short of another end 26 of the pair of ends 26 of the spine 20, and is used to scrape the ice 16 off the windshield 18 that does not require hard scraping.

The first side 22 of the spine 20 further has a second surface 32 that is quarter-circular-shaped and is disposed above the plurality of teeth 28 and bevels 45 degrees continuously therefrom into an end 26 of the pair of ends 26 of the spine 20 and into the apex 21 of the spine, short of the first surface 30 on the first side 22 of the spine 20, and is used to chip the ice 16 from the windshield 18.

The second side 24 of the spine 20 has disposed therealong a third surface 34 that is slender, elongated, and originates from above the plurality of teeth 28 and bevels 45 degrees upwardly therefrom into the apex 21 of the spine, and extends continuously therealong from short of the one end 26 of the pair of ends 26 of the spine 20 to short of the another end 26 of the pair of ends 26 of the spine 20, and is a mirror image of the first surface 30 on the first side 22 of the spine 20.

The third surface 34 on the second side 24 of the spine 20 has disposed along its entire length, a plurality of teeth 36 that are equally spaced-apart and extend coplanarly upwardly from the second side 24 of the spine 20 and perpendicularly inwardly into the apex 21 of the spine 20, and is used to scrape the ice 16 from the windshield 18 that requires hard scraping.

As shown in FIG. 8, the plurality of teeth 36 on the third surface 34 on the second side 24 of the spine 20 can be eliminated.

It will be understood that each of the elements described above, or two or more together, may also find a useful application in other types of constructions differing from the types described above.

While the invention has been illustrated and described as embodied in a combination comb and ice scraper, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A combination comb and ice scraper adaptable to comb hair of a user and to be utilized by the user to scrape ice off a windshield, comprising:

a) a comb for combing the hair of the user; said comb having a spine being longitudinally-disposed and having an apex, a first side, a second side opposing said first side of said spine, and a pair of ends; said comb further having a plurality of teeth extending downwardly from said spine along its entire length; and b) an ice scraper associated with said comb for scraping the ice off the windshield; said first side of said spine of said comb having disposed therealong a first surface being a portion of said ice scraper and being slender, elongated, and originating from above said plurality of teeth and beveling 45 degrees upwardly therefrom into said apex of said spine of said comb, and extending continuously therealong from short of one end of said pair of ends of said spine of said comb to short of another end of said pair of ends of said spine of said comb, and being used to scrape the ice off of the windshield not requiring hard scraping; said first side of said spine of said comb further having a second surface being quarter-circular-shaped and originating above said plurality of teeth and beveling 45 degrees continuously therefrom into an end of said pair of ends of said spine of said comb and into said apex of said spine of said comb, short of said first surface of said first side of said spine of said comb, and being used to chip the ice off the windshield; said second side of said spine of said comb having disposed therealong a third surface being another portion of said ice scraper and being slender, elongated, and originating from above said plurality of teeth and beveling 45 degrees upwardly therefrom into said apex of said spine of said comb, and extending continuously therealong from short of said one end of said pair of ends of said spine of said comb to short of said another end of said pair of ends of said spine of said comb, and being a mirror image of said first surface on said first side of said spine of said comb; said third surface on said second side of said spine of said comb having disposed along its entire length, a plurality of teeth being equally spaced-apart and extending coplanarly upwardly from said second side of said spine of said comb and perpendicularly inwardly into said apex of said spine of said comb, and being used to scrape the ice off the windshield requiring hard scraping.

\* \* \* \* \*